United States Patent [19]

Simeth et al.

[11] Patent Number: 4,806,002

[45] Date of Patent: Feb. 21, 1989

[54] DENSITOMETRIC SENSING DEVICE FOR USE IN PRINTING PRESSES

[75] Inventors: Claus Simeth; Peter Schramm, both of Offenbach am Main, Fed. Rep. of Germany

[73] Assignee: M.A.N. Roland Druckmaschinen, Offenbach am Main, Fed. Rep. of Germany

[21] Appl. No.: 96,859

[22] Filed: Sep. 14, 1987

[30] Foreign Application Priority Data

Sep. 13, 1986 [DE] Fed. Rep. of Germany ....... 3631204

[51] Int. Cl.[4] .............................................. G01N 21/47

[52] U.S. Cl. ...................................... 356/445; 356/380

[58] Field of Search ............... 356/445, 446, 447, 448, 356/379, 380; 101/350, 365, DIG. 24

[56] References Cited

U.S. PATENT DOCUMENTS 3,567,923 3/1971 Hutchison .......................... 101/350

3,756,725 9/1973 Manring ............................. 101/350

4,512,662 4/1985 Tobias ................................ 356/380

*Primary Examiner*—Richard A. Rosenberger

[57] ABSTRACT

A densitometric sensing device in which a density measuring head, which is part of the device, traverses an ink test strip printed on a page which is fed to or placed on the device. The problem of misalignment between the thus-placed ink test strip and the scanning direction of the density measuring head is avoided by providing a plurality of density measuring receivers in the measuring head, mounted transverse to the direction of travel so that the ink test strip is always under some of the receivers. The measured density values of all of the receivers are passed to a comparison circuit which co-operates with a logic circuit to determine from the values of the signals themselves which should be used to produce a composite density value, which is then used as the density for the zone being scanned.

7 Claims, 3 Drawing Sheets

DENSITOMETRIC SENSING DEVICE FOR USE IN PRINTING PRESSES

BACKGROUND OF THE INVENTION

1. Technical Field of the Invention.

This invention relates to printing presses, and more particularly to a densitometric scanner for sensing the density of an ink test strip printed on a page.

2. Related Prior Art.

It is well known that densitometric sensing devices have been used in connection with printing presses to measure the printed density of the ink on a zone-by-zone basis along a test strip usually printed along one edge of the sheet. Standards are set for the desired density in each zone and for each color, and the measured densities are compared against the standards. If one or more of the measured density values are outside the desired range set by the standards, adjustments are made to the press, typically to the ink supply device supplying the particular color ink to the zone in question, until the measured density is brought into the desired range. Sheets are scanned periodically to assure that the densities remain as desired and thus the printed product will be of high quality.

One such scanning device is shown in Ott EP-OS No. 149 424. As disclosed in Ott, an information code is printed adjacent the test strip for accurate location of the appropriate measurement position. This feature is expensive and has the disadvantage that even more space is required on the printed sheet for densitometric sensing, a consideration which further reduces its desirability.

A general disadvantage of devices which automatically scan a test strip for measuring its density is that the printed sheets must be so aligned with the measuring device that the strips which are printed on the sheet must be absolutely parallel to the travel of the sensing device. Thus, the sheets must be accurately aligned on the measuring table because if the strip and guide for the measuring head do not extend parallel to each other, the measuring head may move out of the range of the testing strip and produce faulty information. Indeed, the parallelism problem may arise as early as the make-up stage if the strip is not positioned correctly with respect to the copy. Further problems can be caused by distortion of the sheet in the printing process or by misfeeding of the sheet onto the measuring table.

SUMMARY OF THE INVENTION

The primary object of this invention is to provide accurate densitometric measurement of an ink test strip even when the ink test strip and the travel path of the densitometric receiver are misaligned.

In accordance with the invention, there is provided apparatus for scanning and measuring the optical density of an ink test strip which is partitioned into discrete zones corresponding to the ink density of respective zones of print on a printed sheet. A density measuring head comprises a plurality of density measuring receivers disposed along an axis of the density measuring head perpendicular to its scanning direction and generally transverse to the ink test strip. Electronic comparison means compare the individual outputs of the plurality of density measuring receivers. The electronic comparison means passes signals to logic means which then processes the data from the comparison means and outputs a composite density value for the discrete zone of the ink test strip scanned. Such an arrangement results in the ability to accurately scan an ink test strip even when the strip is misaligned with respect to the scanning direction of the head. In short, as the head traverses a misaligned strip, different ones of the receivers come into play as producing an accurate measurement signal since they are over the strip, and the comparison and logic means determine from those signals which should be selected and output as the composite density value.

Other objects and advantages of the present invention will be apparent from the following detailed description with reference to the accompanying drawings in which:

DESCRIPTION OF THE PREFERRED EMBODIMENTS

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

Figure 1:
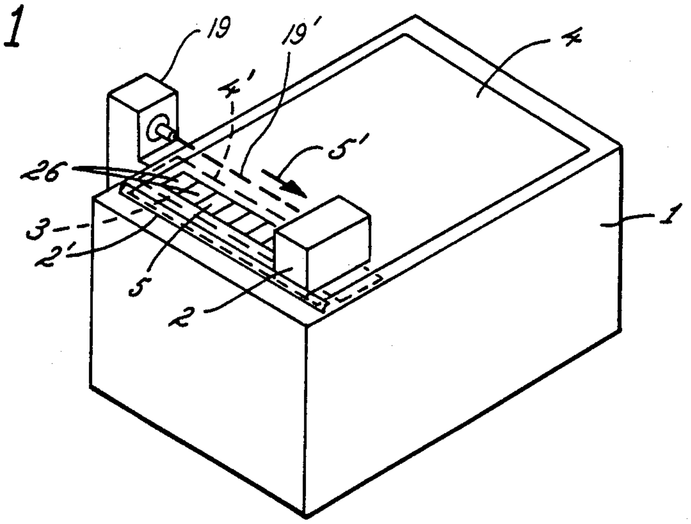
FIG. 1 shows a measuring table on which is located a printed sheet with an ink test strip.

Turning now to the drawings, FIG. 1 schematically illustrates a density measuring system for a printing press which can incorporate a scanning head and evaluation circuitry according to the present invention. The apparatus is based on a measuring table 1 on which a density measuring head 2 is mounted for traversing along guide means 2'. Traversing is accomplished by energizing a drive motor 19. For purposes of simplicity the driving connection 19' between the motor 19, and receiver 2 (as well as the drive system as a whole) is illustrated only schematically, since those elements are well known to those skilled in this art. The drive 19, 19' traverses the head 2 in a scanning direction illustrated by arrow 5'.

The guide means 2' also serves as a stop bar for a printed sheet 4 which bears an ink test strip 5 along one edge thereof. In the illustration, the ink test strip is shown slightly exaggerated in size with respect to the remainder of the sheet for the purpose of clarity. The sheet 4 is held in position on the table by a suction strip 3 disposed generally under the area where the ink test strip is normally printed.

As is well known, the ink test strip comprises a plurality of discrete zones 26, single ones or groups of which correspond generally to the printing zones on the press on which the sheet was printed. The zones can contain solid or screened sections and in multi-color operation will usually contain a section for each color being printed in that zone. Each color must be printed at a particular density in order to achieve the desired printed result. The ink test strip is a tool for separating the colors for individual measurement to simplify the process of seeing what, if any, ink adjustments need be made on the press in order to produce the desired printed product. The ink measuring density system of FIG. 1 is the means for determining whether those individual densities are being achieved.

In order to accomplish that, the printed sheet 4 is fed onto the surface of the table 1 until it abuts the guide 2'. The suction strip 3 is then actuated to hold the sheet in place. The scanning head then traverses from one end of the sheet to the other for the purpose of reading the optical density of each of the individual zones 26.

Figure 2:
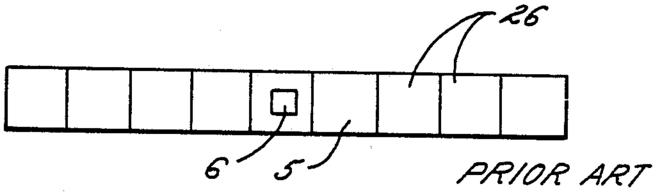
FIG. 2 schematically shows an ink test strip associated with a conventional density measuring device.

FIG. 2 is useful in demonstrating the problem which can be encountered in prior scanning systems. Such scanning systems had only a single sensor 6 within the density measuring head 2 whose function it was to read the optical density of each and every one of the zones 26 on the ink test strip 5. If the printed sheet 4 were not accurately positioned on the table (or alternatively if the ink test strip 5 were not accurately positioned in the make-up stage with respect to the text and therefore with respect to the sheet), the sensor 6 might begin to leave the test strip, thus "seeing" unprinted paper and thus producing erroneous readings. The problem can be better appreciated when one considers the long distance which the head 2 must traverse and the very small dimensions of the ink test strip (to minimize waste, since it is recalled the test strip must be trimmed). The problem arose in large measure because prior measuring heads 2 had only a single density measuring receiver 6. Thus, even with small degrees of misalignment between the scanning direction and the ink test strip, it was entirely possible for the density measuring receiver 6 to cross the edge of the ink test strip and begin measuring part ink test strip and part unprinted paper. It will be clear that erroneous readings would result.

In accordance with the present invention, such erroneous readings are avoided by providing a new sensing head having a plurality of density measuring receivers in combination with means for selecting output signals from particular receivers to produce a composite output signal. The sensing elements of such means are illustrated in FIGS. 3-5 and the relationship between the sensing elements and the remaining means in FIG. 6.

Figure 3:
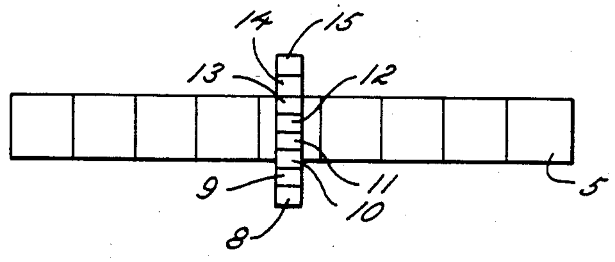
FIG. 3 is a view similar to FIG. 2 but showing an ink test strip associated with the density measuring head of this invention.
Figure 4:
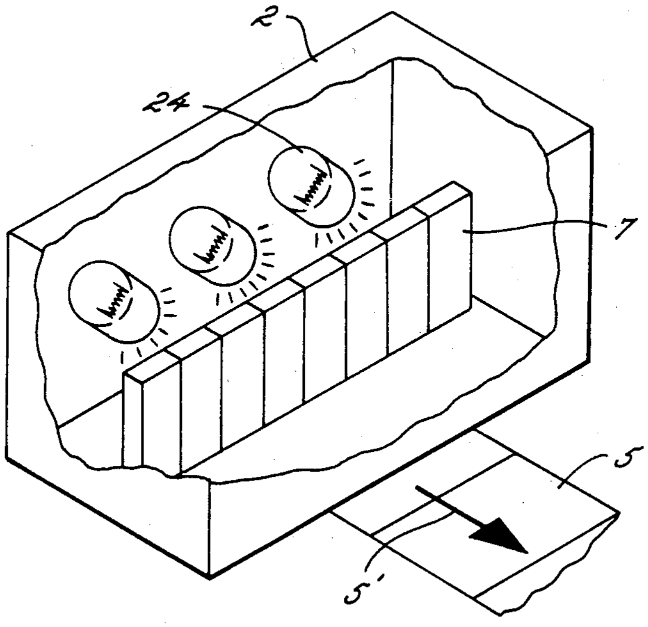
FIG. 4 is a perspective view, partly broken away, showing the density measuring head of this invention associated with an ink test strip.
Figure 5:
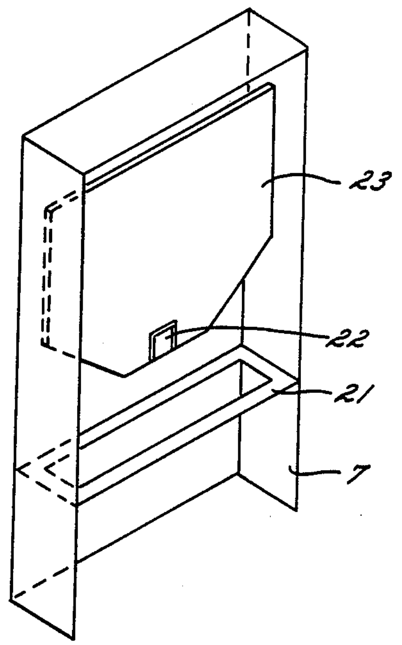
FIG. 5 is a perspective showing an individual density measuring receiver.

Turning first to FIGS. 3 and 4, it is seen that the sensing head 2 includes a plurality of density measuring receivers 8-15 which are disposed perpendicularly to the scanning direction illustrated by arrow 5' and therefore generally transverse to the ink test strip 5. (While eight receivers are used in the illustrated embodiment, it will be clear that the invention is not limited to that specific number). The phrase "generally transverse" is used above because, in accordance with the present invention, the test strip need not be perfectly parallel with the scanning direction 5' and in those cases the density measuring receivers 7 are not "transverse" in an absolutely perpendicular sense with the ink test strip.

Referring again to FIG. 4, it is seen that the density measuring receivers 7 are mounted in side-by-side fashion and span a distance in the scanning head 2 which is substantially wider than the ink test strip 5. Illumination means 24 which can be conventional light bulbs or light emitting diodes illuminate the ink test strip such that light is reflected back toward the receivers 7. Each of the receivers 7 (as illustrated in FIG. 5) includes a mask 21 which functions much like a collimator to cut down on light reflected into the receiver from other than the zone of the printed sheet just below the receiver in question. Sensing means are provided in the receiver, in the FIG. 5 illustration in the form of a photodiode 22 disposed in an enclosure 23 including appropriate biasing circuitry, such as that used with the prior art receiver of FIG. 2. The photodiode thus senses light (collimated to a certain extent by the mask 21) reflected from the area just below the receiver, and little from any other zone. When disposing such receivers in side-by-side fashion as illustrated in FIG. 4, there will be certain receivers looking at unprinted paper, others looking partly at the ink test strip and partly at unprinted paper, and others looking only at the ink test strip. That proposition is also illustrated in FIG. 3 which shows a series of eight receivers 8-15 spanning an ink test strip 5. It is seen that four of the receivers, namely, receivers 8, 9, 14 and 15 scan only unprinted paper and therefore will yield minimum density values. By way of contrast, receivers 11, 12 and 13 scan only the ink test strip and therefore will yield maximum density values. Receiver 10 scans partly unprinted paper and partly the ink test strip and thus will produce an intermediate density value.

Figure 6:
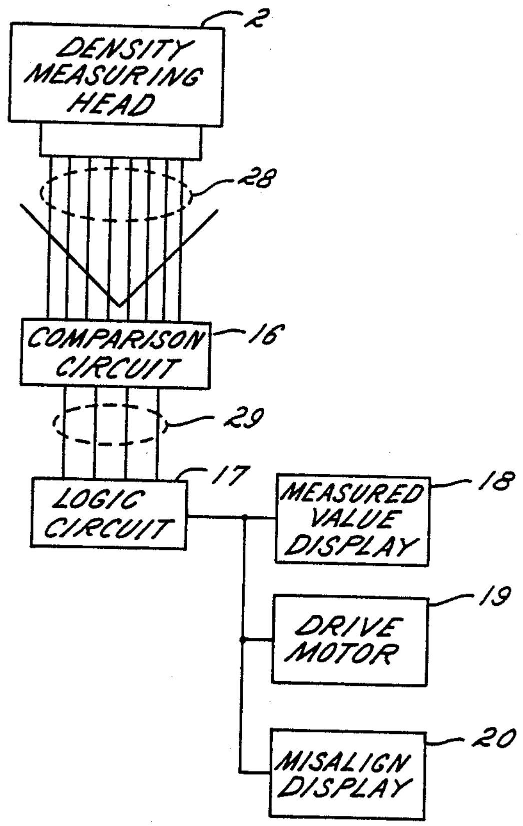
FIG. 6 is a block diagram illustrating a suitable circuit arrangement for the sensing device of this invention.

In further practicing the invention, means are provided for sensing the individual signals from a plurality of receivers, and solely from the content of those signals for determining a composite density value which eliminates the error caused by skew between the ink test strip and the scanning direction. Turning then to FIG. 6, there is illustrated the density measuring head 2 and eight signal output lines 28 from the individual ones of the density measuring receivers 8-15. In the embodiment illustrated in FIG. 6, those signals are passed to a comparison circuit 16. The comparison circuit can be configured in various ways. As a first form, since it is known that there s only one ink test strip and it is somewhere under adjacent receivers, a group of comparators can be provided which simply compare the signal received by any given receiver with its two neighbors in order to isolate the minimum, intermediate and maximum values. Alternatively, in a digital environment, the comparison circuit can simply be an analog multiplexer followed by an analog-to-digital converter, followed by a digital comparator which compares each digitized signal against its neighbors to assign flags identifying minimum, intermediate and maximum values.

In either event, the result of the comparison including both the identification of whether a reading is minimum, intermediate or maximum, as well as the readings themselves are conveyed on lines 29 from the comparison circuit 16 to the logic circuit 17. The logic circuit then determines from the relative ratings of the signals which of the signals should be considered in producing a composite density value, then produces and outputs that value.

Various criteria can be set for the logic circuitry 17 in determining which of the receiver output signals to use in producing the composite density value. For example, in many cases it is preferable to simply select the highest density value and output it. That highest value will likely result from a receiver such as 12 (see FIG. 3) positioned centrally of the ink measuring strip at that point in time. Alternatively, in some cases it is preferable to average a predetermined number of density values such as two or three. Referring again to FIG. 3, additional precision may be achieved if the density values of receivers 11 and 12 are averaged and it is also possible, in that case, to include in the average the value produced by receiver 13. In the averaging scheme, it is also desirable at times to discard data which is below a predetermined minimum, and is therefore likely to originate from receivers which are solely over the unprinted paper. Thus, as an example of that procedure, the signals produced by receivers 8, 9, 10, 14 and 15 could be discarded and remaining receivers, 11, 12 and 13 averaged.

It will be appreciated that there is great flexibility in determining how to use the signals from the receivers based upon their relative ranking in magnitude as well as their actual magnitude, and the foregoing are only illustrations. It is noted, however, that whatever scheme is employed is selected independently, either by the user or by an appropriately programmed microcomputer controlling a digital implementation of the present invention. The form of the scheme of selecting which criteria to use in producing the composite output signal is not important to the present invention, what is important is the fact that the selection is made based on information derived only from the original receiver signals.

The composite density value produced by the logic circuit 17 can be used in various ways. It can be displayed to an operator on a measured value display 18 so that an operator can note any discrepancies. Alternatively or in addition when an out-of-standard value is detected, the drive motor 19 which traverses the scanning head 2 is halted so that the position of the scanning head indicates the out-of-specification inking zone.

As a subsidiary feature of the invention, means are provided for alerting the pressmen to a misaligned condition so severe, which can occur from time to time, as to prevent getting accurate readings even with the present invention. To that end, the comparison circuit 16 continues to compare the output signals from the end receivers 8, 15 to a maximum value. If the reading of either exceeds the maximum value, indicating that one or the other of those receivers is partly over the test strip, the logic circuit 17 produces signals which (a) stop the drive motor 19, and (b) output a misalign display signal to indicate to the operator on misalign display 20 the reading at the point the fault occurred.

It will now be apparent that what has been provided is an improved densitometric sensing device which, by virtue of multiple sensors aligned substantially transversely of an ink test strip, and the manner in which the signals from the sensors are processed to produce a composite density value, can tolerate a significant degree of misalignment between the ink test strip and the scanning direction while still producing useful results.

What is claimed is:

1. Apparatus for scanning and measuring the optical density of an ink test strip printed on a sheet, the ink test strip being partitioned into discrete zones corresponding to the ink density of respective zones of print on the printed sheet, said apparatus comprising the combination of:

(a) a density measuring head comprising a plurality of density measuring receivers disposed in a linear array in said density measuring head perpendicular to the scanning direction of the head and generally transverse to the ink test strip, said linear array being wider than the ink test strip so that some of the receivers scan the ink test strip and others scan adjacent portions of the sheet in each zone being scanned, the density measuring receivers being arranged to produce individual output signals related to the density of the portion of the zone of the sheet being scanned by each receiver;

(b) electronic comparison means for comparing the individual output signals of each of the plurality of density measuring receivers and determining from the output signals which of the receivers are scanning the ink test strip;

(c) logic means for processing the data from the comparison means to select from the output signals those to be used in outputting a composite density value for the discrete zone of the ink test strip scanned.

2. The apparatus of claim further including display means for displaying said composite density value.

3. The apparatus of claim 2 further including transport means comprising:

(a) a drive motor for transporting the density measuring head in the scanning direction along the ink test strip; and (b) means responsive to the logic means for halting the drive motor when predetermined conditions are sensed by the density measuring head.

4. The apparatus of claim 2 wherein the comparator includes means for comparing the output signals produced by the density measuring receivers at the ends of the linear array against a predetermined maximum, and said predetermined condition is one of the end receiver output signals exceeding said predetermined maximum.

5. The apparatus of claim 1 wherein the logic means outputs a composite density value which is the value detected by a single one of the density measuring receivers, said value being selected by the electronic comparison means.

6. The apparatus of claim 1 wherein the logic means outputs a composite density value which is the averaged value of a predetermined number of measured density values, the electronic comparison means selecting the highest density readings for said averaging.

7. The apparatus of claim 1 wherein the logic means outputs a composite density value which is an averaged value determined by said logic means, said logic means establishing a maximum measured density value and disregarding all values below said maximum as determined by said electronic comparison means, said logic means then averaging the remaining measured density values to produce said composite density value.

* * * * *